United States Patent [19]

Lyons et al.

[11] Patent Number: 4,978,863

[45] Date of Patent: Dec. 18, 1990

[54] METHOD AND APPARATUS FOR FIBER OPTIC BACKSCATTERED LIGHT MEASUREMENT TO DETERMINE FLOW RATES OF MULTI-PHASE STREAMS

[75] Inventors: John W. Lyons; John A. Roper, III, both of Midland, Mich.; Peter D. Aldrich, Miami, Fla.

[73] Assignee: The Dow Chemical Company, Midland, Mich.

[21] Appl. No.: 240,860

[22] Filed: Sep. 6, 1988

[51] Int. Cl.⁵ .............................. G01N 15/06
[52] U.S. Cl. ........................... 250/574; 356/28
[58] Field of Search ............... 250/573, 574, 575, 227; 356/336, 337, 338, 339, 340, 341, 342, 343, 28; 73/861.05, 861.06

[56] References Cited

U.S. PATENT DOCUMENTS

| | | |
|---|---|---|
| 3,844,170 | 10/1974 | Critten . |
| 4,248,085 | 2/1981 | Coulthard . |
| 4,259,015 | 3/1981 | Wada .................. 250/574 |
| 4,396,943 | 8/1983 | Lord et al. . |
| 4,516,432 | 5/1985 | Hironaga et al. . |
| 4,573,761 | 3/1986 | McLachlan et al. . |
| 4,643,573 | 2/1987 | McLachlan et al. . |
| 4,664,513 | 5/1987 | Webb et al. .................. 356/28 |
| 4,707,130 | 11/1987 | Hofmann .................. 73/861.06 |
| 4,729,109 | 3/1988 | Adrian et al. .................. 356/28 |
| 4,743,753 | 5/1988 | Cheng .................. 250/227 |

Primary Examiner—David C. Nelsm

[57] ABSTRACT

Flow rates of multi-phase streams may be determined by use of a fiber optic probe which establishes an illuminated sensing zone of finite dimensions. The probe collects light backscattered from the zone, the collected light being converted by a photodiode to voltage waveforms. Flow rate is determined by sampling voltage waveforms at discrete points in time, the sample being digitized and the digits being autocorrelated for such discrete points.

14 Claims, 4 Drawing Sheets

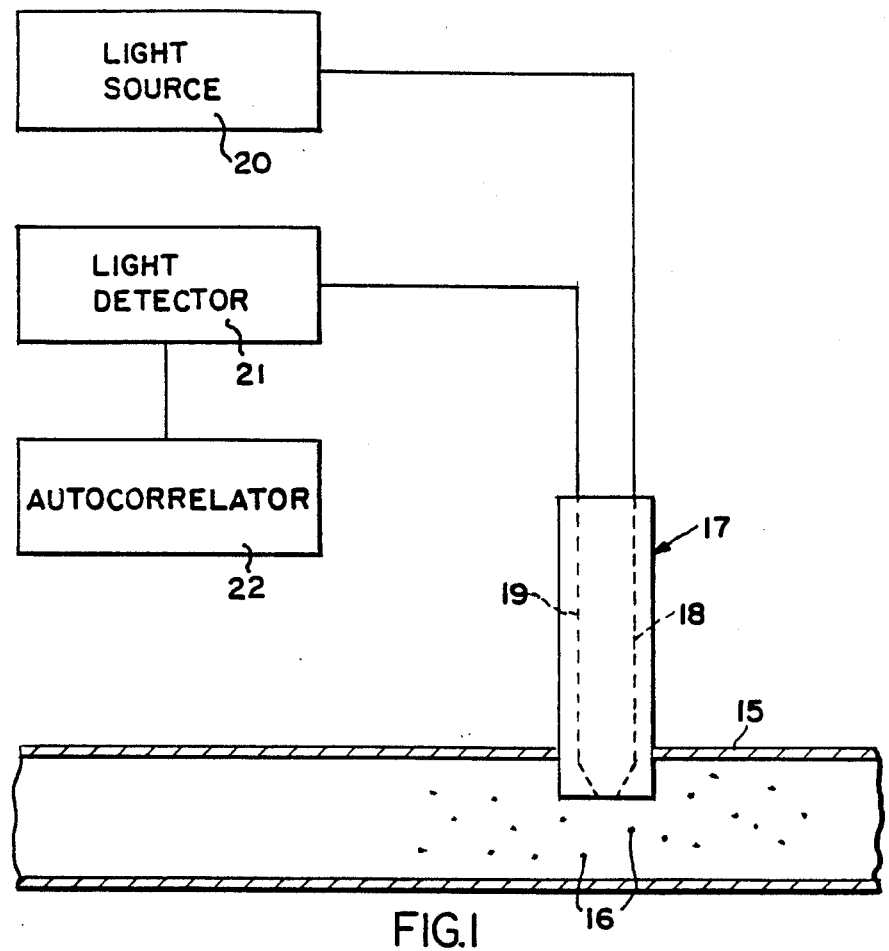
FIG.1
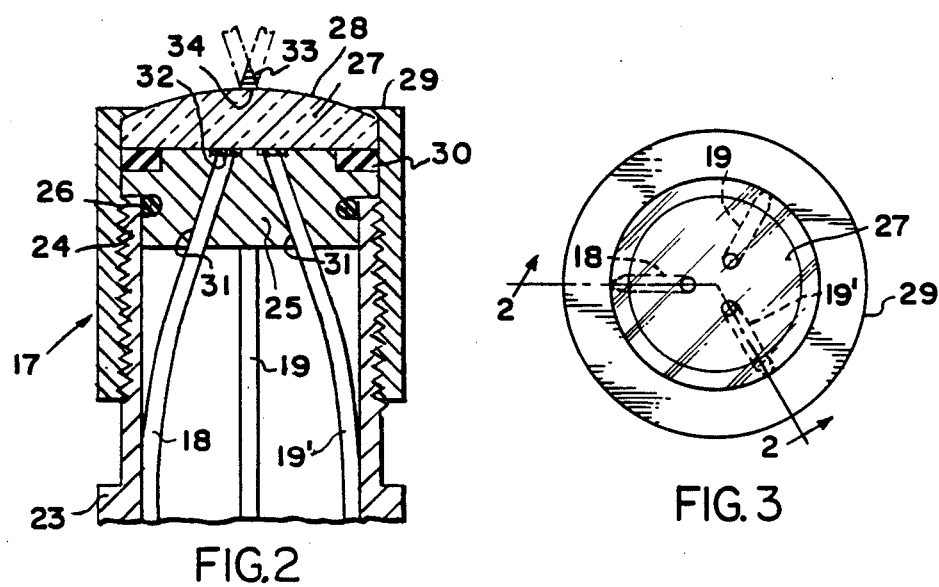
FIG.2
FIG.3

METHOD AND APPARATUS FOR FIBER OPTIC BACKSCATTERED LIGHT MEASUREMENT TO DETERMINE FLOW RATES OF MULTI-PHASE STREAMS

This invention relates to a method and apparatus for measuring flow rates of multi-phase streams by sampling and autocorrelating backscattered light at discrete periods of time.

BACKGROUND OF THE INVENTION

Flow rates of multi-phase streams, such as those including suspended solids, have been measured by cross correlation of upstream and downstream detector outputs based on the time change required for suspended solids to flow from the upstream detector to the downstream detector. Procedures of this type may not be of adequate dependability if, for example, disturbances occur in the multi-phase stream to scramble the position or orientation of the suspended solids being tracked during transit thereof between the two detectors. Such scrambling may occur particularly in turbulent stream flow.

Where two or more spaced probes are utilized, alignment of the probes is essential with respect to the direction of stream flow. Additionally, use of multiple spaced probes inherently extends the time in which a desired analysis of a multi-phase stream flow can be accomplished.

In some systems autocorrelation of the product of spaced detector outputs is utilized. Generation of beat frequencies between the detectors is established resulting from flow-induced Doppler shifts arising from the occurrence of disturbances upstream and downstream. However, in utilizing the frequency of these beats, the autocorrelation of the product of the signals from the detectors becomes rather complex.

In an effort to stabilize flow to permit more accurate determinations of flow rates, a system utilizing a vortex-producing member located upstream from a pair of spaced probes has also been proposed. A series of time-related vortices is generated and autocorrelation of the outputs of the spaced probes, based on the time period between consecutively generated vortices, are averaged.

Still another approach to the determination of flow rate of a multi-phase stream involves fiber optic illumination of at least a segment of the stream and the transmission of images of particles flowing past an endoscope as recorded with a camera and viewing monitor. Presumably, image analysis can be relied upon to obtain flow rate.

Other systems in use include the use of optical fibers to measure bubble flow rate and size. One such system relies on Doppler shifting of monochromatic light. In the operation of this system a bubble impinges on the end of an optical fiber with the fiber penetrating the first surface portion of the bubble and subsequently the second surface portion in order to obtain a flow-by measurement.

As has been explained, the majority of known systems rely on cross correlation techniques. Alignment of the sensors is critical in effective use of such techniques. Additionally, two channels of data need to be sensed and processed. The present invention constitutes a substantial improvement over known flow rate determination procedures.

SUMMARY OF THE INVENTION

The present invention makes use of a single sensor or probe thus eliminating criticality of alignment. Additionally, only one channel of data is sensed thus adding to the overall accuracy and dependability of the system. Less elaborate calculations are required.

The invention utilizes a single fiber optic light emitting and collecting probe in a multi-phase stream. The stream may be gaseous or liquid and contains bubbles, immiscible droplets, or suspended solids (hereinafter sometimes interchangeably referred to as "particles" for convenience) which function as scatter centers for light. The stream may be unbounded or bounded as in an enclosing pipe, and when bounded the velocity of the stream as measured also may be related to the volumetric flow rate of the stream. A small illuminated region or sensing area in the form of zone of finite dimensions is established at the tip of a light transmitting optical fiber forming a part of the probe. This light is scattered or reflected by the particles in the stream, and one or more optical fibers forming a part of the probe intercept the backscattered light, the tip of each such fiber forming a light collection zone. This collected backscattered light is sensed by a photodiode and converted to a voltage, the bandwidth of the resulting voltage waveform being established by the rate of flow of the particles through the sensor zone. Voltage waveforms are sampled at discrete points in time, the samples being digitized to produce a one dimensional array of numbers. The autocorrelation of each array of numbers is computed for a number of time delays and may be normalized by the value of the autocorrelation at zero time, or absolute zero may be determined. Each time delay corresponding to 50 percent decorrelation is inversely proportional to the flow rate of the stream.

Local flow rates may be measured in optically dense media. As a symmetrical sensor zone is established in practicing the present invention, relatively simple computations may be relied upon to determine flow rate. Also, a symmetrical sensor zone establishes non-criticality of probe orientation. Since only one channel of data needs to be sensed, as opposed to a plurality of such channels, conversion time is reduced.

The apparatus of the present invention is relatively uncomplicated. The required apparatus comprises a fiber optic probe provided with at least two optical fibers, one to transmit light and the other to collect backscattered light; a light source; a light detector; and an autocorrelator.

Without calibration the apparatus may be used to monitor relative flow rates. With calibration the apparatus may be used to monitor absolute flow rates in a stream.

The apparatus is useful in turbulent flow condition without the threat of scrambling which can occur in known systems relying upon cross correlation. Flow-induced beat frequencies resulting from Doppler shifts as well as vortex shedding are not involved. The subject system does not require quasi monochromatic radiation, although it can use such radiation for illumination purposes. Since the geometry of the detector probe is symmetrical with respect to the probe axis, precise rotational positioning of the probe is not critical. Variably controlling the geometry of the probe during its construction enables use of the subject system over a wide range of particle sizes and concentrations. No video imaging is required and signal processing is readily implemented.

THE DRAWINGS

FIG. 1 is a schematic block diagram of apparatus of the subject invention;

FIG. 2 is an enlarged, fragmentary, sectional view of the tip portion of a fiber optic probe suitable for use in practicing the subject invention, the sectional view being taken along lines 2—2 in FIG. 3;

FIG. 3 is an end view of the probe;

DETAILED DESCRIPTION

Figure 4:
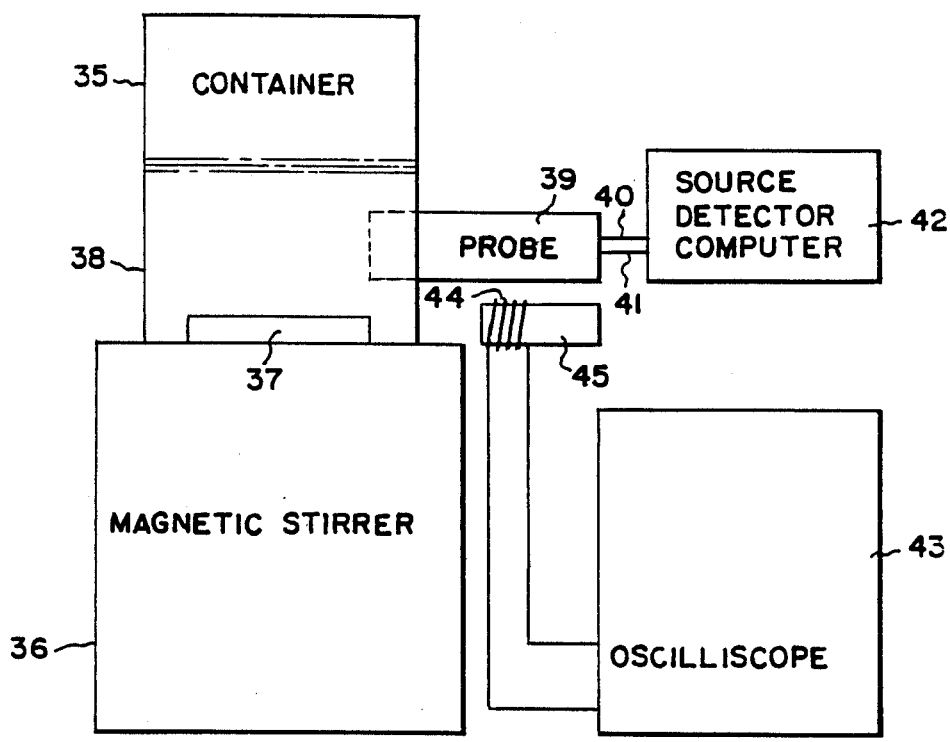
FIG. 4 is a schematic block diagram of apparatus utilized in proving the validity of the subject method.

The present invention relates to the use of a fiber optic probe inserted in a multi-phase stream to establish an illuminated sensor zone of finite dimension accompanied by the collection of backscattered light which is converted to an autocorrelation function, the flow rate of the multi-phase stream being inversely proportional to such function. As used herein a multi-phase stream includes a gaseous or liquid stream having particles, i.e., immiscible liquid droplets, bubbles, or solid materials therein. The invention thus is useful in conjunction with any light scattering gaseous or liquid stream. Such streams further may be fairly opaque or optically dense.

FIG. 1 schematically illustrates a typical system capable of practicing the method of the invention. Flow of a multi-phase stream, the velocity of which is to be measured, may occur in a bounded or unbounded environment. FIG. 1 illustrates multi-phase stream flowing in a pipe 15, the stream containing therein particles 16 capable of backscattering or reflecting light. A fiber optic probe 17 is suitably inserted within pipe 15 to immerse the light transmitting and collecting end of the probe within the stream. The probe 17 may be of any suitable type, such as one including a pair of optical fibers 18 and 19. Fiber 18 is operatively coupled to a light source 20 and fiber 19 is operatively coupled to a light detector 21. An autocorrelator 22 is connected with light detector 21 to complete the system.

While more specifics will be set forth, a number of known types of optical fiber will function in this system and any suitable light source capable of being transmitted by a fiber may be used. For example, a conventional incandescent bulb or light emitting diode (LED) may be used.

Light detector 21 is essentially a photodiode which converts light collected by optical fiber 19 to a voltage waveform. This waveform is amplified by light detector 21 and the bandwidth of each waveform output of light detector 21 is measured by autocorrelator 22, digitized, and normalized consistent with the procedures of the present invention.

The concept of autocorrelation is well known and, in general, autocorrelator 22 is computer controlled by a program which accepts the waveform signals constituting the output of light detector 21 at discrete points in time; digitizes the signals based on variations in bandwidth; uses these digits to determine a zero point; and, based on this zero point, correlates subsequent digitized values relative to the zero point to obtain either relative or absolute flow rates depending upon the nature of the program.

U.S. Pat. No. 4,643,573 discloses a fiber optic probe of suitable construction for use in the present invention. FIGS. 2 and 3 illustrate the tip of such a probe that is designated 17. Probe 17 includes a tubular body 23 formed of suitable metallic or other material appropriate for immersion without adverse consequences in the particular multi-phase medium to be examined. At the tip end of probe 17, body 23 is provided with a reduced collar portion 24 which is externally threaded and which at the outer end thereof receives a window support 25. An O-ring 26 suitably positioned in a circumferential groove formed in support 25 engages the inner surface of the end portion of collar 24 to seal the interior of the probe. Support 25 receives on the outer end thereof a transparent window 27 preferably formed with an outer convex surface 28. Window 27 may be formed from any suitable material, such as glass, quartz, sapphire, or the like. A flanged cap 29 engages the outer peripheral edge of window 27 to hold it o the tip end of probe 17 and extends inwardly into threaded engagement with collar 24 of probe body 23. Support 25 further includes an annular gasket 30 suitably mounted thereon and in engagement with an inner peripheral surface portion of window 27 to seal the latter.

Probe 17 is illustrated as including three optical fibers 18, 19, and 19'. Fiber 18 is the illumination fiber as previously described while in this particular probe design there is provided a pair of backscattered light collection fibers 19 and 19'. The fibers extend through probe body 23 in triangularly spaced relation along the inner surface of body 23 and the ends adjacent support 25 are angled toward one another so that their optical fields intersect on the longitudinal axis of the probe body at a point positioned somewhat beyond window 27 as illustrated in broken lines in FIG. 2.

The angled ends of fibers 18, 19, and 19' are accommodated in suitable passages 31 in support 25 and abut the inner surface of window 27. Preferably, a thin coating 32 of an optical coupling gel or oil having a refractive index similar to that of the fibers and the window is interposed between the window and the confronting ends of the fibers to reduce reflection losses at the fiber/window interface.

Optical intersection of the fibers on the outer surface of window 27 establishes an illuminated sensor field 33 of inverted cone shape as illustrated, the base 34 of the field being of substantially circular cross section so as to permit measurement of such field by its diameter similar to comparative measurement of optical fiber diameters. Thus, as an important aspect of the subject invention, the illumination spot size or dimension of sensor field 33 may be on the order of 2 to 3 mm. This is comparable to optical fiber diameters ranging from 0.4 to 0.6 mm. Theoretically, sensing field 33 can take an infinite number of shapes depending upon the number of optical fibers utilized and the angles of intersection of the ends of such fibers. For example, in use of a probe having two optical fibers, it has been found appropriate to incline each fiber at an angle of approximately 30° relative to the longitudinal axis of the probe body. Separation of the two fibers at the window interface may be on the order of 2 mm.

Since the sensing field is symmetrical, orientation of the probe in a stream is not necessary. The sensing zone may be established at any desired location in the multiphase stream, depending on the depth of immersion of the probe, the height of the illuminated sensing zone, and the turbidity of the stream.

As previously described, light detector 21 converts photon flux transmitted by the collecting optical fiber 19 into a time varying voltage. As stream flow carries a given set of particles or light scattering centers through the sensing zone, such given set of particles is repeatedly replaced by following sets of particles. The time scale over which a fresh set of particles is swept into the sensing zone depends inversely upon the velocity of the stream in the sensing zone. Thus, the bandwidth of each waveform measured over discrete periods of time is related to the velocity of the stream in the sensor zone.

The output of light detector 21 is sampled by autocorrelator 22 at regular intervals and converted to digits which are proportional to the light detector output voltage at the moment of sampling. This is represented by the following:

$$\text{Detector Output} = V(N) \quad \text{Equation 1}$$

where V is the voltage output of the detector 21 and N is an index to denote equally spaced discrete points in time. N has integer values beginning with 1 and ranging up to the total number of data points collected. In the testing to be referred to hereinafter, such data points were separated by $10^{-4}$ seconds.

The normalized autocorrelation array [A(I)] can be calculated as follows:

$$A(I) = \frac{\sum_{N=1}^{M} (V(N) * V(N+I))}{\sum_{N=1}^{M} (V(N) * V(N))} \quad \text{Equation 2}$$

M is assigned a value of 1500 which is the total number of light detector output signals collected for purposes of evaluating the validity of the subject invention, and I is assigned values ranging from 0 to 50 corresponding to a conversion time measured in microseconds.

When plotted, the resulting autocorrelation array, A(I), decays to a constant value for large values of I. This means that, given enough time, the set of light scattering particles in the probed volume will be completely swept free of the sensor zone.

When I=O the normalized autocorrelation function is 1. This means that if the stream flow moves the particles for zero time, the particular set of particles in the sensor zone has not changed or, in other words, has not been replaced by another set of particles.

At intermediate values of I, the autocorrelation function takes on intermediate values. This means that when the stream flow acts on a given set of particles in the sensor zone for an intermediate length of time, some of the original particles of the set have been replaced by others whereas others of the original particles still remain in the set in the sensor zone.

The time scale over which the autocorrelation function decays 50% between the initial and final values is a measure of the time required for 50% of the particles in the probe volume to be replaced by fresh up-stream particles. Any fresh set of particles in the sensor zone will scatter more or less light back to the probe than a previous set. This characteristic time is inversely related to the velocity of the stream. Other features of the autocorrelation function are also related to the velocity of the stream, such as, the initial slope of the autocorrelation function. The subject invention is based on use of the time required for 50% decorrelation of the signal. Thus, there is an inverse relationship between the time required for 50% decay of the autocorrelation function ($t_c$) and the linear flow rate (cm/second) in the probe volume. This is represented by:

$$\text{Linear Flow Rate} = K/t_c \quad \text{Equation 3}$$

Where K is a proportionality constant which is related to the size or dimension of the sensor zone. Absolute calculation of K depends on probe geometry.

Confirmation of the foregoing theory has been established as a result of a series of tests performed using equipment schematically illustrated in FIG. 4. Such equipment comprises a container 35 atop a known type of magnetic stirrer 36 provided with a magnetic stir bar 37 which projects into container 35. Such container is sufficiently filled with a suitable fluid medium containing particles. A fiber optic probe 39 extends through a sealed opening in a side wall of the container so that the tip is immersed in the fluid. The probe 39 includes a pair of optical fibers 40 and 41 suitably coupled to a light source, a light detector and an autocorrelator in the manner shown in FIG. 1, these components being illustrated in FIG. 4 as a combined unit 42. While optical fibers 40 and 41 may be used interchangeably, fiber 40 is shown as being coupled to the light source forming a part of unit 42 and fiber 41 is shown as being coupled to the light detector portion of unit 42 which in turn is connected to the autocorrelator portion of unit 42. The system also includes an oscilloscope 43 connected to a pick-up having a coil 44 which is wound on an iron core 45 in alignment with stir bar 37.

The medium 38 contained of polystyrene, spherical particles in water in sufficient quantity to establish a 20% by volume fraction. The diameter of the spheres averaged 650 microns. Magnetic stirrer 36 rotated stir bar 37 in its horizontal plane in a known manner to produce a generally circular flow in medium 38 to cause the particles therein to move past the tip of probe 39. The probe tip was spaced approximately 1.125 inches from the rotational axis of stir bar 37.

The rate of rotation of stir bar 37 was varied to provide a number of different stirring rates. Each stir rate was determined by measuring the period of the electrical signal generated in the pick-up as a result of rotation of the stirrer. The electrical signal generated in light detector portion of unit 42 at each of the different stir rates was processed in the manner previously described by the autocorrelator portion of unit 42 to generate a series of autocorrelation functions as shown in FIG. 5.

Figure 5:
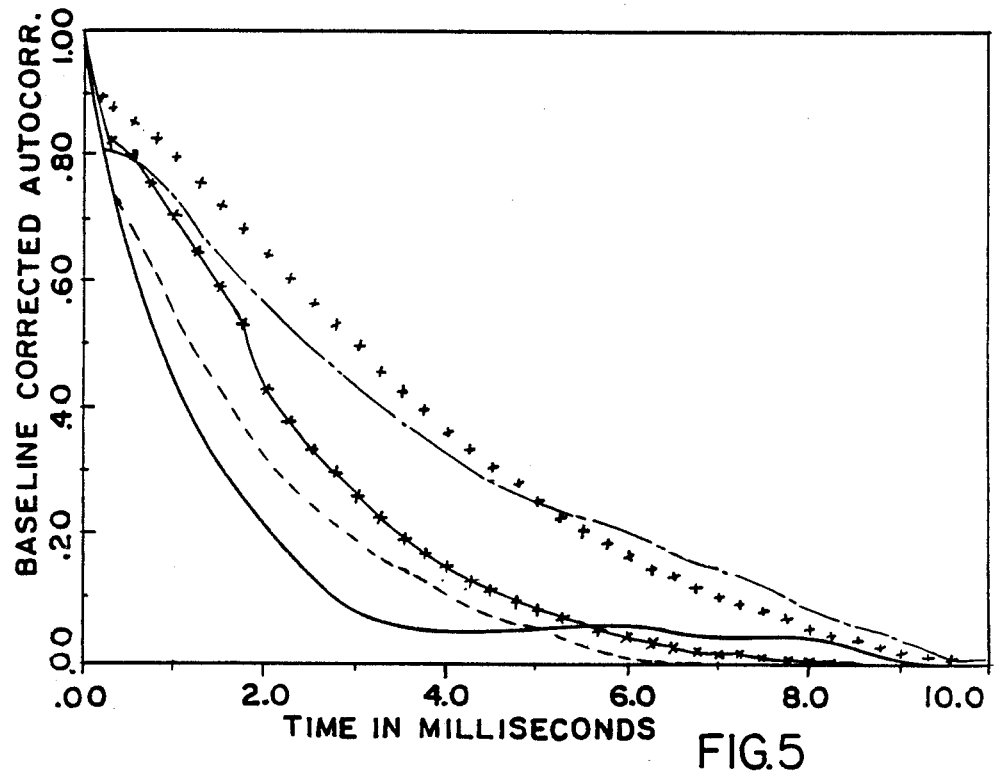
FIG. 5 is a graph of autocorrelations resulting from different stir rates.
Figure 6:
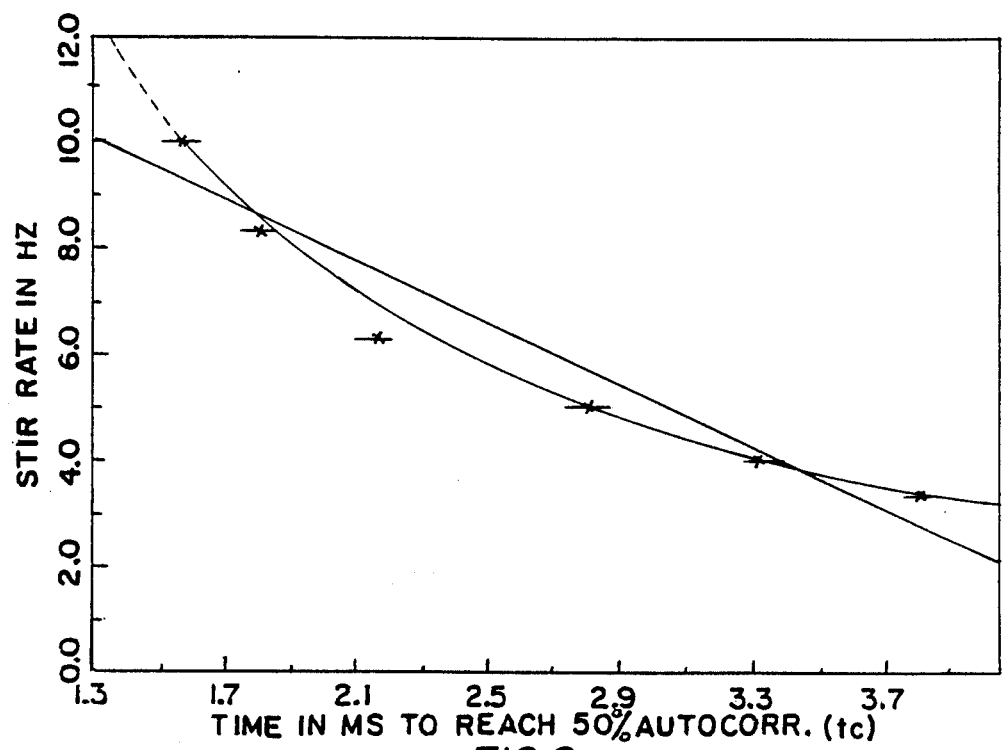
FIG. 6 is a graph plotting the stir rate versus the time required to reach 50% autocorrelation.

FIG. 5 plots baseline corrected autocorrelations versus elapsed time in milliseconds, the data points being separated by $10^{-4}$ seconds. Using the data of FIG. 5, the time required for 50% decay of the autocorrelation function ($t_c$) was calculated for each of the different stir rates and plotted versus stir rate in FIG. 6. Thus, FIG. 6 expresses stir rate in Hertz, as measured by oscilloscope 43, plotted against the time required (milliseconds) to reach 50% autocorrelation.

Figure 7:
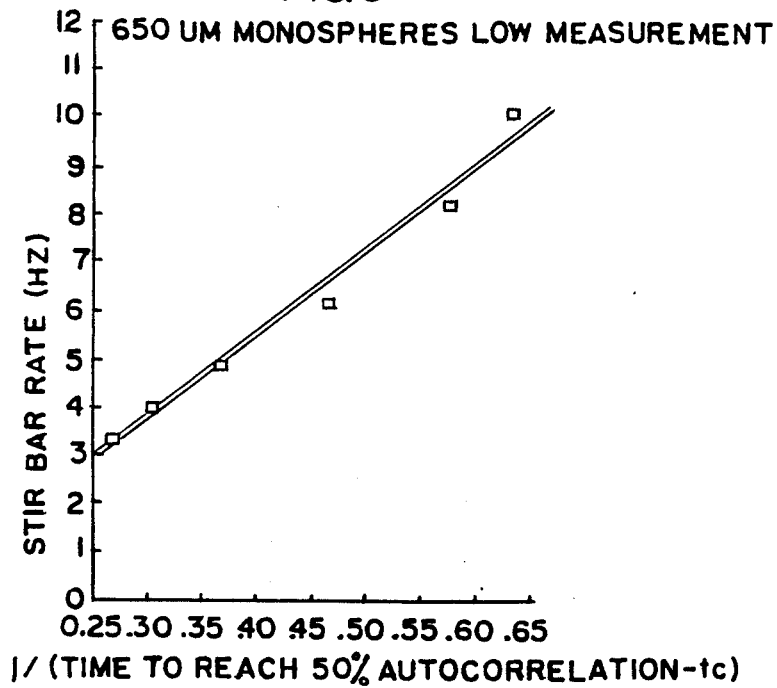
FIG. 7 is a graph plotting the stir rate versus inverse autocorrelation time periods.

FIG. 7 illustrates the expected linear relationship between flow rate (cm/second) and $1/t_c$. The time required to reach 50% of autocorrelation is inversely proportional to stir rate which in turn is directly proportional to flow rate as shown by:

$$\text{Flow Rate} = \text{Stir Rate (sec}^{-1}) \cdot 2\pi\ r(= 2.86 \text{ cm}) \quad \text{Equation 4}$$
$$= \text{Stir Rate (sec}^{-1}) \cdot 17.95 \text{ cm}$$

Referring to the apparatus schematically illustrated in FIG. 4, the two-fiber probe 39 was provided with fibers of approximately 6 mm. in diameter. The probe itself was constructed similar to the three-fiber probe 17 of FIGS. 2 and 3 with the axes of the pair of fibers at the point of engagement with the inner surface of window 27 being inclined at 30° relative to the axis of the probe. The fibers were separated approximately 2 mm. These geometrical relationships produced a sensing zone of finite size.

Figure 8:
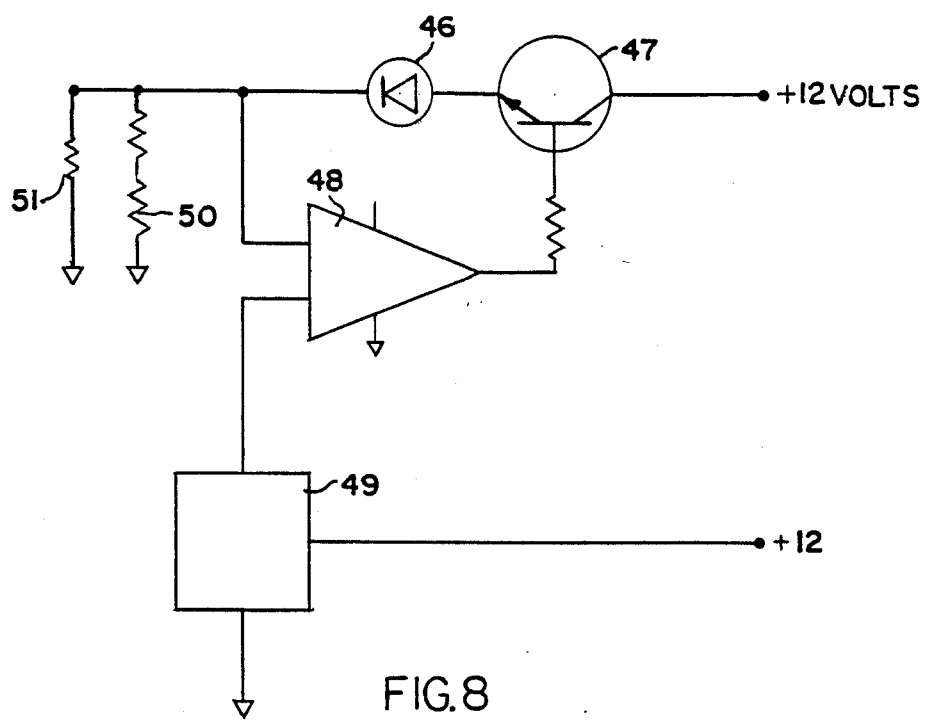
FIG. 8 is a schematic diagram of a suitable light source for use in the present invention.

The autocorrelator used in the combined light source light detection-and computer unit 42 (FIG. 4) included a Burr-Brown analog-to-digital converter interfaced to an Intel 80/20-4 single board computer with an extra memory board. FIG. 8 schematically illustrates the light source circuitry which in general includes a light emitting diode 46 such as a Honeywell SPX 4689, a 2N222 transistor 47, a Texas Instruments TLC 271 amplifier with adjustable gain 48, a reference voltage supply 49 available from PMI (Precision Monolithics Inc.), and suitable resistors 50 and 51, all of these components being combined in known manner to provide a suitable source of light for probe 39.

Figure 9:
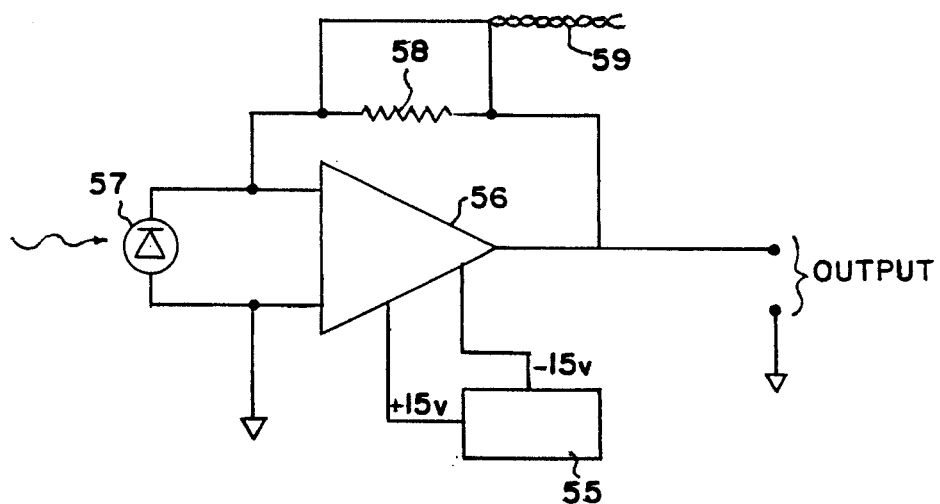
FIG. 9 is a schematic diagram of a suitable light detector for use in the subject invention.

FIG. 9 is a schematic of the circuitry and components forming the light detector portion of combined unit 42. This portion includes a 15 volt power supply 55 (Acopian Corporation, 5E25D-D15EO5). Amplifier 56 (Precision Monolithics Inc., PMI OP-15) is operatively connected to the terminals of power supply 55 with its output being connected to the autocorrelator portion of unit 42. Photodiode 57 (United Detector Technology, FO-02-400) receives light from the collector fiber as previously described and transmits a corresponding waveform to amplifier 56. Resistor 58 operates between the outputs of photodiode 57 and amplifier 56 and, as used, provided a resistance of $10^7$ ohms. The circuitry is completed with a twisted wire pair 59 bridging resistor 58 and formed from No. 18 polytetrafluourethlyene coated wires selectively cut to length so as to maximize the bandwidth of each waveform without gain peaking.

As previously described any suitable light source may be used in the conventional manner, such as a conventional incandescent bulb, light emitting diode, or a tungsten filament bulb. Relative or absolute velocities may be determined within an accuracy range of 5 to 15%. An average of approximately 20 autocorrelations requires no more than five minutes of processing time, thus providing a flow rate measuring system of excellent reaction time.

Local flow rates may be measured in optically dense media and, as previously described, since the sensing zone is symmetrical, orientation of the probe is not critical. The subject method and apparatus may be used to determine local flow rates in multi-phase streams ranging from very dilute (1 ppm.) conditions to very concentrated (50% by volume) conditions.

The sensing zone may be located at any position within the stream at any depth desired as long as the sensing zone is adequately established. Because the sensing zone is finite, turbulent flow as well as laminar flow conditions may be measured.

Particles preferably should be 1/100 the diameter of the sensing zone or larger. As the concentration of particles decreases, the size of the particles capable of effectively backscattering light can decrease as well. Particles capable of most effectively providing accurately measureable backscattered light are greater than 10 microns in size.

The use of a single probe not only eliminates alignment problems, but also minimizes the number of required data channels thus eliminating more elaborate calculations and system functions while increasing speed of response. The geometry of the light collector fiber of the probe is symmetrical with respect to the probe axis and, therefore, precise rotational positioning of the probe with respect to such axis is not critical. The size and location of the probed volume may be controlled for specific applications by varying the geometry of the probe at the time of construction. This enables operation over a wide range of particle sizes and concentrations. Thus, the method and apparatus described are extremely flexible and offer a wide range of effective utilization in a cost and time effective manner.

What is claimed is:

1. A method of determining flow rates in a fluid medium containing particles capable of backscattering light, said method comprising:
  (a) illuminating a single, finite and symmetrical zone of said medium with light capable of being backscattered by said particles;
  (b) collecting backscattered light from said zone;
  (c) converting said backscattered light into voltage waveforms; and
  (d) determining flow rates by autocorrelation of the bandwidths of said waveforms at discrete points in time.

2. The method of claim 1 wherein said multi-phase medium comprises a liquid.

3. The method of claim 1 wherein said medium is gaseous.

4. The method of claim 1 wherein said particles are in the form of solids, bubbles, or immiscible droplets.

5. The method of claim 1 wherein each discrete point in time establishes a time delay corresponding to 50 percent decorrelation decay between initial and final values.

6. The method of claim 1 wherein said zone is of essentially circular cross-section.

7. The method of claim 1 wherein said particles are present in the range of about 1 ppm to 50% by volume.

8. The method of claim 1 wherein said particles are at least 10 microns in size.

9. The method of claim 1 wherein relative or absolute flow rates may be determined.

10. The method of claim 1 wherein a single combination light-emitting and backscatter light-collecting probe having a light-emitting tip is utilized to define said zone.

11. The method of claim 1 wherein at least two optical fibers are aligned with said zone to define a single probe, delivering light to said zone via one of said fibers and collecting backscattered light from said zone by the other of said fibers, said one fiber being connected to a light source and said other fiber being connected to a light detector.

12. Apparatus for determining flow rates of a fluid medium containing particles capable of backscattering light, said apparatus comprising:

(a) single probe means for illuminating a single, finite and symmetrical zone of said medium with light capable of being backscattered by said particles;

(b) said probe means including means for collecting backscattered light from said zone;

(c) means for converting said collected backscattered light into voltage waveforms; and (d) autocorrelation means for measuring the bandwidths of said waveforms at discrete points in time to determine fluid medium flow rates.

13. The apparatus of claim 12 wherein said probe means is at least in part immersible in said medium and comprises at least two optical fibers, one of said fibers being coupled to a light source to provide illumination of said zone, the other of said fibers constituting said means for collecting backscattered light and being connected to light detector means which includes said converting means.

14. The apparatus of claim 13 wherein said light detector means comprises a photodiode.

* * * * *